US010042032B2

(12) United States Patent
Scott et al.

(10) Patent No.: US 10,042,032 B2
(45) Date of Patent: Aug. 7, 2018

(54) SYSTEM AND METHOD FOR GENERATING RECOMMENDATIONS BASED ON SIMILARITIES BETWEEN LOCATION INFORMATION OF MULTIPLE USERS

(75) Inventors: Sean M. Scott, Sammamish, WA (US); Francis J. Kane, Jr., Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 12/431,995

(22) Filed: Apr. 29, 2009

(65) Prior Publication Data

US 2010/0280920 A1     Nov. 4, 2010

(51) Int. Cl.
*G06Q 30/00* (2012.01)
*G01S 5/00* (2006.01)
(Continued)

(52) U.S. Cl.
CPC ............ *G01S 5/0027* (2013.01); *G06Q 30/00* (2013.01); *G06Q 30/0603* (2013.01); *G06Q 30/0631* (2013.01); *G01S 5/02* (2013.01)

(58) Field of Classification Search
CPC .... G06Q 30/02; G06Q 30/0273; G06Q 30/00; G06Q 30/0603; G06Q 30/0631; G01S 5/0027
(Continued)

(56) References Cited

U.S. PATENT DOCUMENTS 5,732,398 A * 3/1998 Tagawa .............................. 705/5
6,014,090 A   1/2000 Rosen et al.
(Continued)

FOREIGN PATENT DOCUMENTS

CN      101122909      2/2008
JP      2001265809     9/2001
(Continued)

OTHER PUBLICATIONS

Francesco Ricci et al. "ITR: a Case-Based Travel Advisory System" S. Craw and A. Preece (Eds.): ECCBR 2002, LNAI 2416, pp. 613-627, 2002. © Springer-Verlag Berlin Heidelberg 2002.*
(Continued)

*Primary Examiner* — Naeem U Haq
(74) *Attorney, Agent, or Firm* — Robert C. Kowert; Meyertons, Hood, Kivlin, Kowert & Goetzel, P.C.

(57) ABSTRACT

Various embodiments of a system and method for generating recommendations based on similarities between location information of multiple users are described. Various embodiments may include a location-based recommendation system configured to, for each given user of a group of users, determine the given user has traveled to one or more respective locations and determine one or more characteristics of the given user. The system may also determine that a particular user has traveled to or will travel to each of one or more particular locations. The system may further determine a similarity between the one or more particular locations and one or more locations to which specific ones of the group of users have traveled. The system may generate a recommendation for the particular user based on at least some of the determined characteristics of the specific ones of the group of users for which the similarity was determined.

35 Claims, 9 Drawing Sheets

(51) Int. Cl.
　　*G06Q 30/06*　　　(2012.01)
　　*G01S 5/02*　　　(2010.01)
(58) Field of Classification Search
　　USPC ............ 705/26, 27, 26.1, 26.2, 26.25, 26.3,
　　　　　　　　705/26.35, 26.4, 26.41–26.44, 26.5,
　　　　　　　　705/26.61–26.64, 26.7, 26.8, 26.81,
　　　　　　　　705/26.82, 26.9, 27.1, 27.2
　　See application file for complete search history.

(56) References Cited

U.S. PATENT DOCUMENTS

| | | | |
|---|---|---|---|
| 6,321,221 | B1 * | 11/2001 | Bieganski |
| 6,618,593 | B1 | 9/2003 | Drutman et al. |
| 7,071,842 | B1 | 7/2006 | Brady, Jr. |
| 7,412,202 | B2 * | 8/2008 | Gutta et al. .................. 455/3.01 |
| 7,689,452 | B2 * | 3/2010 | Lam et al. ....................... 705/10 |
| 7,991,650 | B2 * | 8/2011 | Kane, Jr. ...................... 705/26.7 |
| 8,620,532 | B2 * | 12/2013 | Curtis et al. ..................... 701/50 |
| 8,775,570 | B2 * | 7/2014 | Sandholm ......... G06Q 30/0631 709/200 |
| 9,818,146 | B2 * | 11/2017 | Caralis ............... G06Q 30/0631 |
| 2001/0025248 | A1 | 9/2001 | Nihei |
| 2002/0065797 | A1 * | 5/2002 | Meidan et al. ................... 707/1 |
| 2002/0161671 | A1 * | 10/2002 | Matsui et al. ................... 705/27 |
| 2003/0004743 | A1 | 1/2003 | Callegari |
| 2004/0103092 | A1 | 5/2004 | Tuzhilin et al. |
| 2004/0203746 | A1 * | 10/2004 | Knauerhase et al. ...... 455/432.1 |
| 2004/0203901 | A1 | 10/2004 | Wilson et al. |
| 2006/0266830 | A1 | 11/2006 | Horozov et al. |
| 2007/0005419 | A1 | 1/2007 | Horvitz et al. |
| 2007/0179863 | A1 * | 8/2007 | Stoll ............................... 705/26 |
| 2007/0185768 | A1 | 8/2007 | Vengroff et al. |
| 2007/0237096 | A1 | 10/2007 | Vengroff et al. |
| 2007/0281689 | A1 | 12/2007 | Altman et al. |
| 2008/0098313 | A1 * | 4/2008 | Pollack ......................... 715/753 |
| 2008/0133336 | A1 | 6/2008 | Altman et al. |
| 2009/0005968 | A1 | 1/2009 | Vengroff |
| 2009/0005987 | A1 | 1/2009 | Vengroff et al. |
| 2009/0143977 | A1 * | 6/2009 | Beletski et al. .............. 701/201 |
| 2009/0157613 | A1 * | 6/2009 | Strohmenger et al. ........... 707/3 |
| 2010/0042460 | A1 * | 2/2010 | Kane, Jr. .......................... 705/9 |
| 2010/0106603 | A1 * | 4/2010 | Dey et al. ................... 705/14.63 |
| 2013/0041696 | A1 * | 2/2013 | Richard ............................ 705/5 |

FOREIGN PATENT DOCUMENTS

| | | |
|---|---|---|
| JP | 2002-74142 A | 3/2002 |
| JP | 2007-200099 A | 8/2007 |
| KR | 10-2006-0003257 | 1/2006 |
| WO | 00/04464 | 1/2000 |

OTHER PUBLICATIONS

Francesco Ricci et al. "Supporting Travel Decision Making Through Personalized Recommendation" © 2004 Kluwer Academic Publishers. Printed in the Netherlands.*
Francesco Ricci, "Travel Recommender Systems", eCommerce and Tourism Research Laboratory, IEEE Intelligent Systems, Nov./Dec. 2002, pp. 55-57.*
Wan-Shiou Yang et al. "A location-aware recommender system for mobile shopping environments" Expert Systems with Applications 34 (2008) 437-445. (Year: 2008).*
Mauro Brunato et al. "A Location-Dependent Recommender System for the Web" Technical report DIT-02-0093, Università di Trento, Nov. 2002. (Year: 2002).*
Natalia Marmasse et al. "Location-Aware Information Delivery with ConnMotion", P. Thomas and H.-W. Gellersen (Eds.): HUC 2000, LNCS 1927, pp. 157-171, 2000. © Springer-Verlag Berlin Heidelberg 2000. (Year: 2000).*
Ulrike Gretzel et al. "Tell Me Who You Are and I Will Tell You Where to Go: Use of Travel Personalities in Destination Recommendation Systems" Information Technology & Tourism, vol. 7 pp. 3-12, Copyright @ 2004 Cognizant Comm. Corp. (Year: 2004).*
Cane Wingki Leung et al. "Towards Collaborative Travel Recommender Systems" The Fourth International Conference on Electronic Business (ICEB2004) pp. 445-451. (Year: 2004).*
International Search Report from PCT/US 10/32715, dated Jul. 14, 2010, 6 pages.
Office Action from Japanese Patent Application No. 2012-508631, dated Jan. 14, 2014, Japanese and English versions, pp. 1-4.
Office Action from Korean Patent Application No. 10-2011-7028291, dated May 22, 2013, (English Translation and Japanese Versions), pp. 1-9.
Young Byung Park, "System and Method for Offering Music Selection Recommendation Service Based on Conditional Variables in Website" Korean Patent Publication No. 1020060003257, Published Oct. 1, 2006, English abstract and Korean version, pp. 1-8.
European Search Report in application No. PCT/US2010032715 dated Apr. 3, 2013 pp. 1-5.
Hiroyuki Shinoda et al "A Ubiquitous Activity Navigation Method by Collaborative Filtering based on Behavioral Characteristics", IPSJ SIG Technical Report, Information Processing Society of Japan, Sep. 20, 2007, vol. 2007, No. 91, pp. 87-92.
Office Action from Japanese Patent Application No. 2012-508631, dated Mar. 5, 2013, (English Translation and Japanese Versions), pp. 1-6.
Notice of Preliminary Rejection for Korean Patent Application No. 10-2011-7028291, dated Nov. 27, 2013, English and Korean versions, pp. 1-9.
"Yunnan, Livelihood for Chinese Ethnic Minorities," Naver blog, Oct. 6, 2008, (English Translation and Korean Versions) pp. 1-12.
Office Action from Korean Patent Application No. 10-2011-7028291, dated Jul. 30, 2013, (English Translation and Japanese Versions), pp. 1-6.
Office Action from Chinese Patent Application No. 201080019259.0, dated Jun. 12, 2014, English and Chinese versions, pp. 1-41.
Office Action from Korean Patent Application No. 10-2014-7002057, dated May 8, 2014, English and Korean versions, pp. 1-6.
Chinese Office Action from Application No. 201080019259.0, Amazon Technologies, Inc., dated Jan. 16, 2015, pp. 1-19.
Canadian Office Action from Application No. 2,760,308, Amazon Technologies, Inc., dated Apr. 12, 2017, pp. 1-6.

* cited by examiner for each given user of multiple users: receiving user location information for the given user from one or more computing devices associated with the given user, and determining one or more user characteristics for the given user
320 receiving user location information for a particular user from one or more computing devices associated with that particular user
322 determining a particular subset of the multiple users that are similar to the particular user, wherein determining the particular subset includes determining a similarity between the user location information of the particular user and the user location information of the particular subset of the multiple users
324 for said particular user, generating a recommendation based on the user characteristics corresponding to the particular subset of the multiple users
326

FIG. 3B

SYSTEM AND METHOD FOR GENERATING RECOMMENDATIONS BASED ON SIMILARITIES BETWEEN LOCATION INFORMATION OF MULTIPLE USERS

BACKGROUND

Mobile phones and other portable communication devices have gone from being rare and expensive pieces of equipment used primarily by the business elite, to a pervasive low-cost personal item. In many countries, mobile phones now outnumber land-line telephones, with most adults and many children now owning mobile phones. In the United States, 50% of children own mobile phones. It is not uncommon for people to simply own a mobile phone instead of a land-line for their residence. In some developing countries there is little existing fixed-line infrastructure and consequently mobile phone use has become widespread. In general, a mobile or cellular telephone is a long-range, portable electronic device for personal telecommunications over long (or short) distances. Most current mobile phones connect to a cellular network of base stations (cell sites), which is in turn interconnected to the public switched telephone network (PSTN) (the exception are satellite phones). With high levels of mobile telephone penetration, a mobile culture has evolved, where the phone becomes a key social tool, and people rely on their mobile phone address book to keep in touch with their friends. Many phones offer text-messaging services to increase the simplicity and ease of texting on phones. Many people keep in touch using text messaging, such as SMS, and a whole culture of "texting" has developed from this.

Recently modern mobile phones or other mobile devices may be located either by cell-signal triangulation or through Global Positioning System (GPS) tracking. In general, mobile device service providers are increasingly required to provide positioning information to support emergency services. When using cell-signal triangulation, mobile device users can be tracked at all times regardless of whether a cell call is underway. For instance, since mobile devices perform a periodic connectivity check to the service provider, the check registers the device relative to cell towers and can be used for triangulation.

Another technology exhibiting a rise in popularity includes electronic data networks, such as the Internet. The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

Various applications of the Internet, and of the web, involve marketplaces that provide goods and/or services for sale. For instance, consumers may visit a merchant's website to view and/or purchase goods and services offered for sale by the merchant (and/or third party merchants). Some network-based marketplaces (e.g., Internet- or web-based marketplaces) include large electronic catalogues of items offered for sale. For each item offered for sale, such electronic catalogues typically include product detail pages (e.g., a web page) that specifies various information about the item, such as a description of the item, one or more pictures of the item, as well as specifications (e.g., weight, dimensions, capabilities) of the item.

BRIEF DESCRIPTION OF THE DRAWINGS

FIGS. 3A-3C illustrates flowcharts of example methods for generating user recommendations, according to various embodiments.

Figure 1:
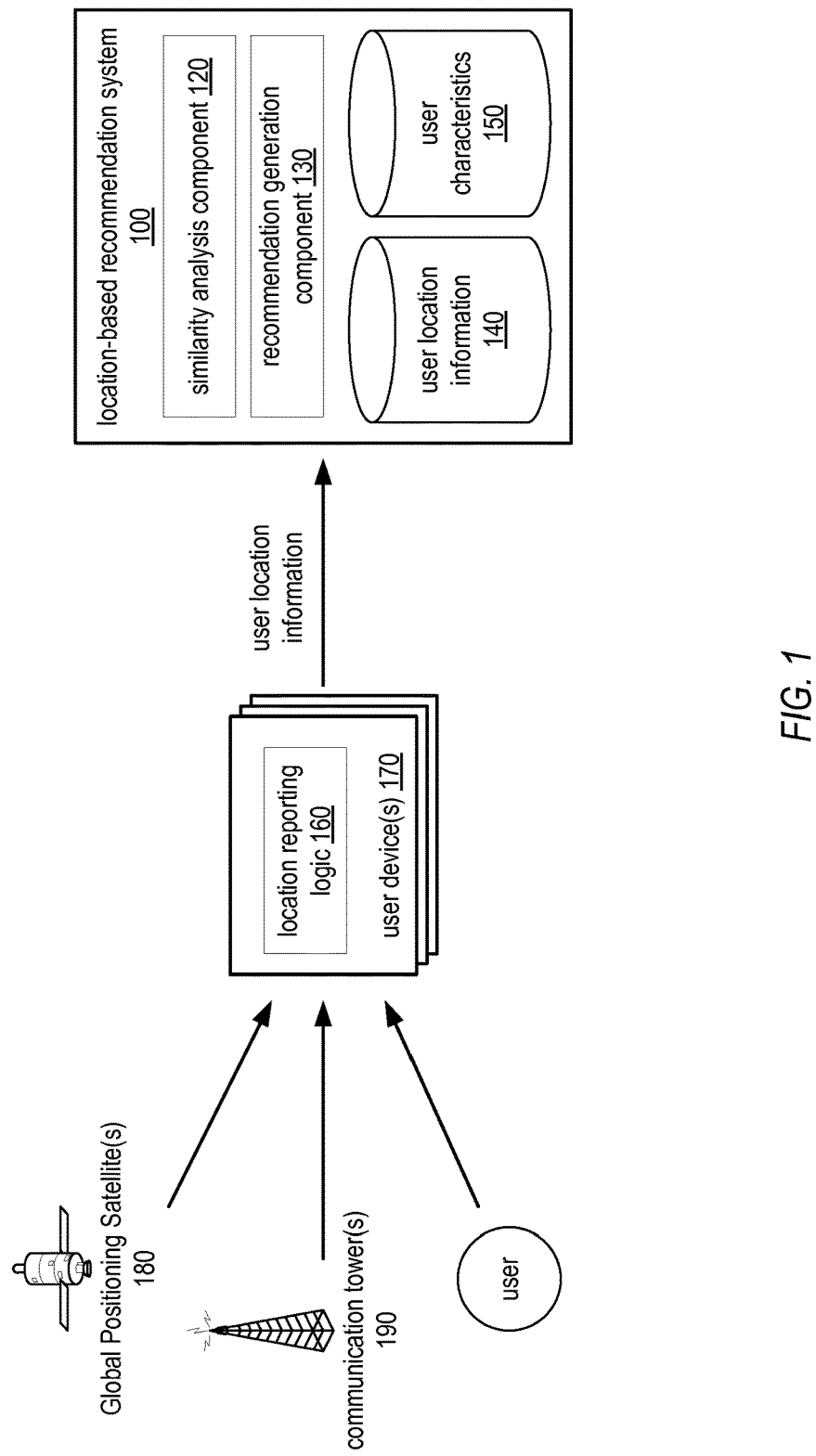
FIG. 1 illustrates a logical representation of the collection of user location information, according to some embodiments.

While the system and method for generating recommendations based on similarities between location information of multiple users is described herein by way of example for several embodiments and illustrative drawings, those skilled in the art will recognize that the system and method for generating recommendations based on similarities between location information of multiple users is not limited to the embodiments or drawings described. It should be understood, that the drawings and detailed description thereto are not intended to limit the system and method for generating recommendations based on similarities between location information of multiple users to the particular form disclosed, but on the contrary, the intention is to cover all modifications, equivalents and alternatives falling within the spirit and scope of the system and method for generating recommendations based on similarities between location information of multiple users as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for generating recommendations based on similarities between location information of multiple users are described. The system and method for generating recommendations based on similarities between location information of multiple users may include a location-based recommendation system configured to generate recommendations for multiple users (e.g., recommendations for items or services). To do so, the location-based recommendation system may be configured to collect and aggregate data for multiple users. This data may include location data that specifies past, present, and/or future locations of ones of the users. For example, in one embodiment, the location-based recommendation system may receive location information from a mobile phone (including but not limited to a mobile phone equipped with GPS functionality). Other examples of user devices that may be utilized in various embodiments are described in more detail herein below. As described in more detail below, the collected data may also include various user characteristics including but not limited to a user's purchase history, such as a purchase history from an electronic marketplace.

The location-based recommendation system may be configured to compare location information of a particular user to location information collected for multiple other users. This comparison may include but is not limited to determining similarities among location information for a particular user and location information for one or more other users. Note that, for a given user, location information may include but is not limited to information indicating locations to which that user has traveled, locations in which that user is currently traveling, and locations to which the user is expected to or predicted to travel. For example, the location-based recommendation system may be configured to determine that the particular user and one or more other users have each traveled to Whistler, British Columbia (e.g., as part of a skiing excursion). Based on such similarities, the location-based recommendation system may generate one or more recommendations for the particular user. For instance, a given recommendation for the particular user may be based on user characteristics of the one or more other users (e.g., the one or more other users determined to have similar location information). In one example, the location-based recommendation system may select an item or service purchased by at least some of the one or more other users (e.g., as indicated by their associated user characteristics) and generate a recommendation for that item or service. For instance, a significant portion of users that traveled to Whistler, British Columbia may have purchased ski goggles (or other ski equipment). In this example, the recommendation generated by the location-based recommendation system may be a recommendation to purchase such ski goggles. In various embodiments, the location-based recommendation system may be configured to send that recommendation to the particular user (or a device under the user's control). In one example, the particular user might be participating in a browsing session by viewing one or more web pages of an e-commerce website through a web browser (or other network-based browser). In this example, the location-based recommendation system may be configured to insert the recommendation for ski goggles into one of the web pages viewed by the particular user.

Determination of User Location Information

FIG. 1 illustrates a logical representation of the collection of location information by the location-based recommendation system according various embodiments. As illustrated, the location-based recommendation system 100 may be configured to collect location information for multiple users from respective user devices 170 associated with those users. User devices 170 may be any of a variety of electronic devices including but not limited to mobile phones or cell phones, electronic book ("e-book") readers, smart phones, personal digital assistants (PDAs), laptop or notebook computers, desktop computers, other types of computer systems, navigation systems (e.g., handheld GPS navigation devices or in-dash vehicle navigation systems), wristwatches or pagers configured for 2-way communication, or other electronic devices configured to communicate information or data to other systems. In some embodiments, user device(s) 170 may represent any device configured with location reporting logic 160 (described below), whether such devices are described herein or developed in the future. Particular instances of this description may in some cases refer to specific examples of user devices (e.g., mobile phones); it should be understood that these instances are presented in a non-limiting manner. Indeed, as used herein, functionality or operation of various embodiments presented with respect to a particular example of a user device may also apply to other examples of user devices.

User devices may in various embodiments be configured to determine a user's location. To determine a user's position, user device 170 may include various functionalities including the ability to determine a user's location through use of GPS. For instance, user device 170 may be configured to receive GPS signals from multiple global positioning satellites 180. Based on the GPS signals received, the user device may calculate a location of the user, such as a location expressed in latitude and longitude coordinates. In other embodiments, the user device may be configured to determine the user's location through various alternative techniques including but not limited to alternatives to GPS, such as China's Beidou Navigation System or Russia's Global Navigation Satellite System. In other embodiments, user device 170 may be configured to determine a user's location based on communication tower triangulation. For instance, user device 170 may be configured to triangulate its own position based on signals received from communication towers 190, which may be a cellular communication tower or other communication tower configured for wireless communications. In other embodiments, a mobile service provider controlling communication towers 190 may triangulate the location of a user device 170 and transmit that location to location-based recommendation system 100. For instance, the service provider may provide the user device location directly to the location-based recommendation system. In another example, the service provider may provide the location to location reporting logic 160, which may then forward the location to the location-based recommendation system. In various embodiments, techniques other than triangulation may be utilized. For instance, user device 170 (and/or a mobile service provider) may be configured to determine the location of a user device from a single communication tower. For example, if the location of a communication tower is known to be located with a particular region and user device 170 communicates with that communication tower, the location of the user device can be considered to be the same as such region.

One skilled in the art will recognize that any of various methods may be employed to determine a user's location. It is the intention of various embodiments to include all such methods for determining a user's location, whether such methods are presently known or developed in the future. Also, note that for the purposes of this description, a user's location and the location of the user's device may in various embodiments be equivalent (or considered equivalent). Indeed, in some cases, the granularity of the location information may allow for small differences between a user's location (e.g., the distance between a mobile user and their mobile phone or laptop computer) may be considered negligible. In other embodiments, a finer granularity may be utilized and such differences may be taken into account. Also note that various embodiments may utilize any of various granularities for a "location." For instance, a location may refer to a point location (e.g., as indicated by latitude/longitude coordinates) or a region (e.g., a city, town, state, country, district, province, territory, place of commerce, etc.). Note that other terms may also be utilized to refer to a location, such as "position," "region," "locale," "locality," "place," "spot," etc. It is the intention of various embodiments to include any of these various types of locations.

In various embodiments, "locations" need not be limited to locations having political boundaries. For example, in various embodiments a location may encompass a metro area without well-defined political boundaries. In another example, a location might only refer to a portion of a larger area. For instance, a city could be partitioned into two locations, such as an east location and a west location. In some cases, locations utilized by the location-based recommendation system 100 may be nested within one another. For instance, a given region may be broken down into smaller regions and even single locations, such as points-of-interest (e.g., retail stores, gas stations, tourist attractions, etc.).

In various embodiments, locations may include algorithmically defined regions determined by location-based recommendation system 100. For example, various clustering techniques may be utilized to determine distance metrics for various users. For instance, such a distance metric may include one or more of a geographic distance component (e.g., a measure of the distance between locations of users) as well as a behavioral distance component (e.g., a measure of similarity of the behavior of various users). Such a behavioral distance component may be based on any of the user characteristics described herein below (e.g., user characteristics 150) including but not limited to network-based activities (e.g., viewing particular network-based content, performing particular activities in a network-based environment, etc.). In some embodiments, clustering techniques may be performed on the distance metrics of multiple users to determine optimal regions of users. In some cases, a threshold may specify the minimum number of users required for a cluster to be considered a region. In some cases, such techniques may result in asymmetric geographic regions. For instance, areas with high population densities may result in geographically smaller regions whereas areas with low population densities may result in geographically larger regions.

In addition to user device 170 (or a mobile service provider) actively determining the location of user device 170, various embodiments may utilize user input (e.g., input received from the illustrated user) to determine a past, present, or future location of the user associated with the mobile device. For instance, in one embodiment, the user device 170 may be configured with a user interface that is configured to receive an indication of a location from a user and any associated metadata, such as information specifying when the user was present at that location or when the user will be present at that location. In one embodiment, the user interface may be configured to receive latitude and longitude coordinates that specify a particular location from the user, such as might entered through a keypad or keyboard. In some embodiments, the user interface may provide a map with selectable location (e.g., a user may select a location with a pointing device, such as a mouse). In other cases, the user interface may provide any of a variety of controls or menus for selecting such locations, such as a drop-down menu of cities or countries.

In some embodiments, the user location information transferred to location-based recommendation system 100 may include geotagged photos and/or metadata of geotagged photos. For instance, in one embodiment, a geotagged photo may include an electronic image and information indicating where the image was photographed (e.g., GPS coordinates or other location information) as well as other information such as the time and/or date at which the image was photographed. In one example, the user interface described above may be configured to receive a selection of one or more geotagged photos to be uploaded to location-based recommendation system 100.

Note that in various embodiments, user location information may include various other types of information or data in addition to a user's location. For instance, in some embodiments, user location information may include a user's location and a time or range of time at which the user was present at that location. In some cases, user location information may also include a user identifier (e.g., a name, username, numeric identifier, or some other identifier). In some cases, user location information may also include any authentication information that may sometimes be required by the location-based recommendation system 100. For instance, a password or other authentication information may be included within user location information.

In some embodiments, location-based recommendation system 100 may be configured to determine a user's location based on comparing an internet protocol (IP) address (or other network-based address) to known locations for various IP addresses or ranges of IP addresses. In some cases, location-based recommendation system may be configured to determine a user's identity by accessing a file from a user device 170 that identifies the user (e.g., a web browser cookie). The location-based recommendation system may be configured to generate a record of that user's location in user location information 140 based on the user's identity as determined from such file and the location determined based on the particular IP address (or other network-based address) of the user.

Collection and Aggregation of User Location Information

The user location information determined according to the techniques described above may be reported to the location-based recommendation system 100, either by location reporting logic 160 of user device(s) 170 or by some intermediary system (e.g., a mobile service provider system). The location reporting logic 160 may transmit such user location information to the location-based recommendation system on a periodic or aperiodic basis. For example, in one embodiment, location reporting logic 160 may be configured to report user location information every hour or every minute (in other cases, other time granularities may be utilized). In another example, location reporting logic 160 may be configured to send user location information to location-based recommendation system 100 in response to determining that a user's location has changed. In another example, location reporting logic 160 may be configured to send user location information to location-based recommendation system 100 on an as needed basis. For instance, location-based recommendation system 100 may periodically or aperiodically query ones of user devices 170 for user location information.

In one particular embodiment, location reporting logic 160 may be a component of an application installed on user device 170. For instance, user device 170 may include an electronic commerce ("e-commerce") application configured to enable a user of the mobile device to view, purchase, review, discuss and/or rate various items or services offered for sale. In various embodiments, location reporting logic 160 may be a component of such an e-commerce application.

In various embodiments, location reporting logic 160 may enable a user to turn location reporting on or off. For instance, a user may "opt-in" to reporting user location information to location-based recommendation system 100 after indicating they have read various terms and conditions. For instance, terms and conditions may be presented to the user on a display of a user device 170; the user may agree to such terms and conditions by pressing a particular button or selecting a particular portion of the display (e.g., an "I agree" button or similar element). In some cases, a user may also access the user interface of user device 170 to "opt-out" or turn off the reporting of user location information.

In some embodiments, the location reporting logic 160 may be a component of a web page (or other network-based content) presented to a user via a web browser (or other network-based browser). For instance, the user may login to an e-commerce website or another type of website and specify one or more locations to which they have traveled or will travel. In another example, a user might upload a file (e.g., a location log file from a mobile phone or memory card) via location reporting logic 160.

Location-based recommendation system 100 may be configured to store and aggregate user location information collected from multiple (in some cases many) user devices 170. For instance, user location information 140 may in various embodiments be a data store that includes such user location information. In various embodiments, a data store may be configured as a database, as one or more mass storage devices (e.g., physical disks, logical volumes, etc.) configured to store data blocks or files, or in any other suitable configuration for data storage.

In various embodiments, the location-based recommendation system 100 may also be configured to collect and aggregate user characteristics about the same users for which it collects location information. In the illustrated embodiment, such user characteristics are illustrated as user characteristics 150, which may in some cases be stored in a data store similar to user location information 140. In various embodiments, user characteristics may include purchase histories for various users. A given user's purchase history may specify items or services purchased by that user as well as metadata about the purchases (e.g., time/date of purchase, amount spent, shipping or billing address, etc.). In some embodiments, such information may be obtained from an e-commerce website or an entity controlling such website. For instance, as customers purchase items or services via such e-commerce website, histories of such purchases may be stored as user characteristics 150. Also note that in some embodiments, any portion of user location information 140 and/or user characteristics 150 may be weighted with a time decay value that diminishes over a configurable time.

In various embodiments, characteristics other than purchase histories may be stored for various users. For example, in one embodiment, the user characteristics may specify which applications the user utilizes on his user device 170. For example, location reporting logic 160 may also report such characteristics to location-based recommendation system in addition to reporting user location information.

In various embodiments, the user characteristics may specify to which services a user is subscribed. For instance, in one example, such a user characteristics might specify that a user is subscribed to a dating service (e.g., a dating service offered by an entity controlling location-based recommendation system). Example uses for such a user characteristic is described in more detail below with respect to the generation of recommendations.

In various embodiments, user characteristics may include but are not limited to network-based activity (e.g., Internet-based activity). Example of such activity may include network content accessed by a user, including but not limited to which item detail pages (or any other web pages) a user has accessed on an e-commerce website (or any other website). In some cases, such user characteristics may also include other user actions such as adding items to wish lists, rating items, or any other activity that may be performed on an e-commerce website (or any other website).

Generating Recommendations

Figure 2:
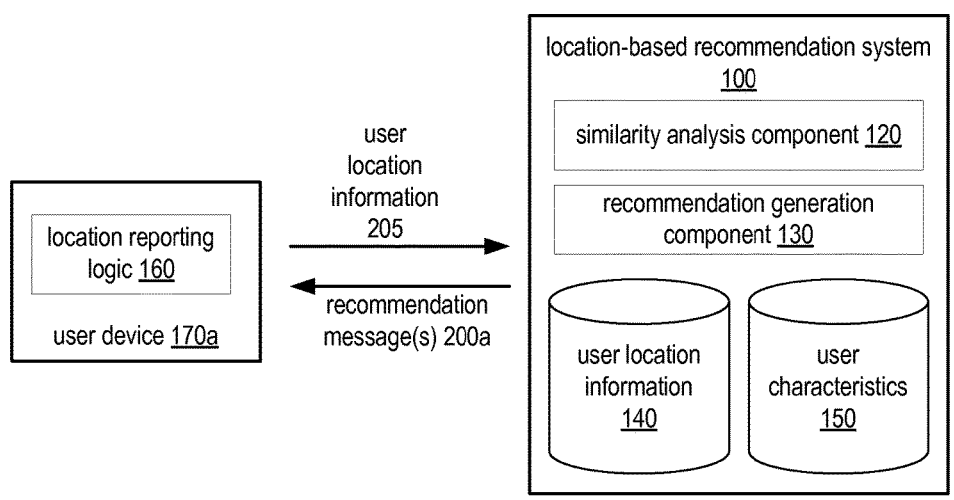
FIG. 2 illustrates the generation and transmission of a recommendation message, according to some embodiments.

As illustrated in FIG. 2, location-based recommendation system 100 may be configured to generate one or more recommendations that may delivered to various user devices, such as recommendation messages 200*a-b*. In various embodiments, location-based recommendation system 100 may include a similarity component 120 configured to determine similarities among user location information for distinct users. Based on the results of that analysis, recommendation generation component 130 may be configured to generate recommendations, which may be sent by the location-based recommendation system 100 to user devices associated with the appropriate user for which the recommendation is intended.

In various embodiments, similarity analysis component 120 may be configured to compare user location information for a particular user to user location information for various other users, such as the user location information stored as user location information 140. In some embodiments, similarity analysis component 120 may be configured to determine a similarity between a particular user's location information and the location information of one or more other users by determining that a location from the particular user's location information matches (e.g., is the same as) a location from the location information of the one or more other users. For instance, the similarity analysis component may be configured to determine that a particular user and one or more other users each traveled to (and/or will travel to) Napa, Calif. Such information may be utilized for generating recommendations as described in more detail below.

In some embodiments, similarity analysis component 120 may be configured to determine a similarity between a particular user's location information and the location information of one or more other users by determining that a specific group of locations (e.g., multiple locations) from the particular user's location information matches a specific group of locations from the location information of the one or more other users. For instance, the similarity analysis component may be configured to determine that a particular user and one or more other users each traveled to (and/or will travel to) a group of locations including Napa, Calif.; Sausalito, Calif.; and San Francisco, Calif. Such information may be utilized for generating recommendations as described in more detail below.

In some embodiments, similarity analysis component 120 may be configured to determine a similarity between a particular user's location information and the location information of one or more other users by determining that a specific path of locations (e.g., a specific series of locations traveled in a certain order) from the particular user's location information matches a specific path of locations from the location information of the one or more other users. For instance, the similarity analysis component may be configured to determine that a particular user and one or more other users each traveled to (and/or will travel to) Tacoma, Wash. and then to Seattle, Wash. before arriving in Everett, Wash. Such information may be utilized for generating recommendations as described in more detail below.

In some embodiments, similarity analysis component 120 may be configured to determine a similarity between a particular user's location information and the location information of one or more other users by determining that one or more locations (e.g., a from the particular user's location information) are located within the same region as one or more locations from the location information of the one or more other users. For instance, the similarity analysis component may be configured to determine that a particular user and one or more other users each traveled to cites within a particular region (e.g., the state of Texas). In some cases, a similarity between the user location information of the particular user and the user location information of the one or more other users may be detected even when the particular user and the one or more other users did not necessarily travel to the same location within the same region. For instance, the particular user may have traveled to Austin and Houston whereas the one or more other users may have traveled to Dallas and El Paso. Such information may be utilized for generating recommendations as described in more detail below.

In some embodiments, the similarity analysis component 120 may be configured to consider the time at which one or more locations were traveled to (or will be traveled to) when determining similarities among user location information. For instance, in some cases, the similarity analysis component may only consider locations to be matches if they were visited in the same season (e.g., summer, winter, fall, spring) or some other range of time. In other cases, the similarity analysis component may only consider locations to be matches if they were visited within a specific time period of each other. For instance, if a particular user visited Seattle, a second user visited Seattle a week later, and a third user visited Seattle 6 months later, the similarity analysis component may be configured to only consider the particular user and the second user to have matching locations even though the third user also visited Seattle.

In accordance with any of the similarity matching techniques described above, the similarity analysis component may indicate to recommendation generation component 130 a particular user that traveled to (or will travel to) one or more particular locations and one or more other users that also traveled to (or will travel to) the same locations. For example, similarity analysis component 120 may be configured to output a user identifier of the particular user and one or more other user identifiers that correspond to one or more other users that traveled to (or will travel to) the same locations as the particular user.

Based on results provided by the similarity analysis component 120, recommendation generation component 130 may generate one or more recommendations (e.g., recommendations for items or services) for respective users. In various embodiments, recommendation generation component 130 may be configured to refine the results provided by similarity analysis component 120 prior to generating recommendations. For instance, if similarity analysis component 120 indicates that a particular user and a group of one or more other users are similar based on locations traveled, the recommendation generation component 130 may be configured to cull users from the group of one or more other users on the basis of user characteristics (e.g., user characteristics 150). In one example, when a particular user and a group of one or more other users are indicated as similar based on locations traveled, the recommendation generation component 130 may disqualify some users from the group of one or more other users if such users do not have certain characteristics that match the characteristics of the particular user. For example, if the particular user is age 40, the recommendation generation component 130 may only consider users having an age within 5 years of age 40 as actually being similar to the particular user. The recommendation generation component 130 may operate in a similar manner for other types of characteristics (e.g., demographics or other information) from user characteristics 150.

In one example, the similarity analysis component 120 may present recommendation generation component 130 with a list that indicates a particular user and one other user are determined to be similar according to any of the techniques described above. In this example, the recommendation generation component may be configured to generate a recommendation that includes a recommendation for any characteristic associated with the other user, such as determined from user characteristics 150. For example, the recommendation generation component 130 may lookup one or more items or services purchased by the other user as specified in a purchase history of user characteristics 150. The recommendation generation component 130 may be configured to generate a recommendation for one or more of such items or services. The recommendation generation component 130 may also be configured to generate a message that includes such recommendation and send such message to a user device 170 associated with the particular user (e.g., a mobile phone, or laptop computer, or some other device). In other cases, instead of items or services purchased, other characteristics of the other user may be recommended to the particular user. For instance, if the other user has a particular application installed on his mobile device (e.g., as indicated by characteristics 150), the recommendation generated may include a recommendation for that application (e.g., a mobile phone application). In another example, if the other user has visited a particular place of commerce (e.g., a particular chain of bookstores or other places of commerce), the recommendation generated may include a recommendation for that place of commerce.

If the output of similarity analysis component 120 indicates a particular user and a group of users determined to be associated with location information similar to that of the particular user, the recommendation generation component 130 may determine one or more of the most common or popular characteristics associated with the group of users on which to base its recommendation for the particular user. In one example, the recommendation generation component 120 may be configured to rank the items purchased by the group of users based on the number of users from the group that purchased each item. In this example, the recommendation component 120 may be configured to recommend the highest ranked item (or the 2nd highest, 3rd highest, etc.) to the particular user. A similar ranking and recommendation may be performed for any other characteristic of user characteristics 150.

In various embodiments, the recommendation generation component 130 may be configured to generate recommendations that are tailored to a specific region. For instance, in the example of ranked items presented above, the recommendation generation component 130 may be configured to disqualify recommendations for items or services that, while ranked highly, are not uniquely ranked for a given location. Consider an example where item A, item B, and item C are ranked highly for a given location (e.g., a city or state). In this example, item A, item D, and item E may be ranked highly for a larger region that includes the given location (e.g., an entire nation). In this example, while item A is ranked highly for the given location, its ranking may not be unique to that region since it is also highly ranked for the region including the given location. In fact, in some cases, item A may be ranked highly in numerous locations within the larger region. In accordance with these techniques, recommendation generation component 130 may be configured to recommend items that are to some extent uniquely and highly ranked for a given location.

In various embodiments, the recommendation generation component 130 may be configured to generate recommendations of one or more other users for a particular user. For instance, as described above, if the one or more other users are determined to be subscribed to a dating service (e.g., as indicated by user characteristics 150), the recommendation generation component 130 may generate a recommendation for a particular user that recommends the particular user view a dating profile of the one or more other users (or perform one or more other actions, such as contact the one or more other users via email or phone).

In various embodiments, recommendation generation component 130 may be configured to generate recommendations for one or more locations that a user may be interested in. For instance, a user may specify a location to which he is going to travel and the recommendation generation component 130 may generate a recommendation for another location (e.g., a side trip or additional destination) that the user may be interested in. In some embodiments, this recommendation may be generated based on the location information and/or user characteristics of other users, such as users that traveled to the same destination or users with user characteristics (e.g., purchase histories, web surfing characteristics, etc.) as the user for which the recommendation is being generated.

As illustrated by FIG. 2, various recommendation messages that include the recommendations described above may be sent to ones of user devices 170 by the location-based recommendation system 100. In one example, user device 170a may send real-time (or near real-time) updates (illustrated as user location information 205) to location-based recommendation system 100 (e.g., as the user moves from location to location). In response to such updates, location-based recommendation system 100 may be configured to generate (according to the techniques described herein) one or more recommendation message(s) 200a and send such message(s) to user device 170a. In the illustrated embodiment, a user may carry user device 170a (e.g., a mobile phone or other mobile device) as he travels to various locations.

Location-based recommendation system 100 may send recommendation messages (e.g., recommendation messages 200a) to ones of user devices 170 according to a variety of techniques. In one embodiment, location-based recommendation system 100 may be configured to send text messages (such as messages formatted in accordance with the Short Message Service) to user device 170a. In another example, location-based recommendation system 100 may be configured to send recommendation messages to ones of user devices 170 as part of one or more web pages (or other network based content). For instance, a user may utilize a web browser of a user device 170 to access web pages of an e-commerce website; location-based recommendation system 100 may be configured to deliver recommendation messages as elements of such web pages. Also note that in various embodiments recommendation messages may be sent to user devices other than the user devices from which user location information was obtained. For instance, a user may own both a mobile phone and a laptop computer. In this example, user location information may be obtained from the mobile phone, and recommendations may be sent to the laptop computer. In various embodiments, recommendations may include information for obtaining whatever item or service (or anything else) that is recommended. For example, a recommendation message might include a hyperlink (or other network-based identifier) to an item detail page of an e-commerce website from which the recommended item or service may be purchased.

Example Methods

Figure 3A:
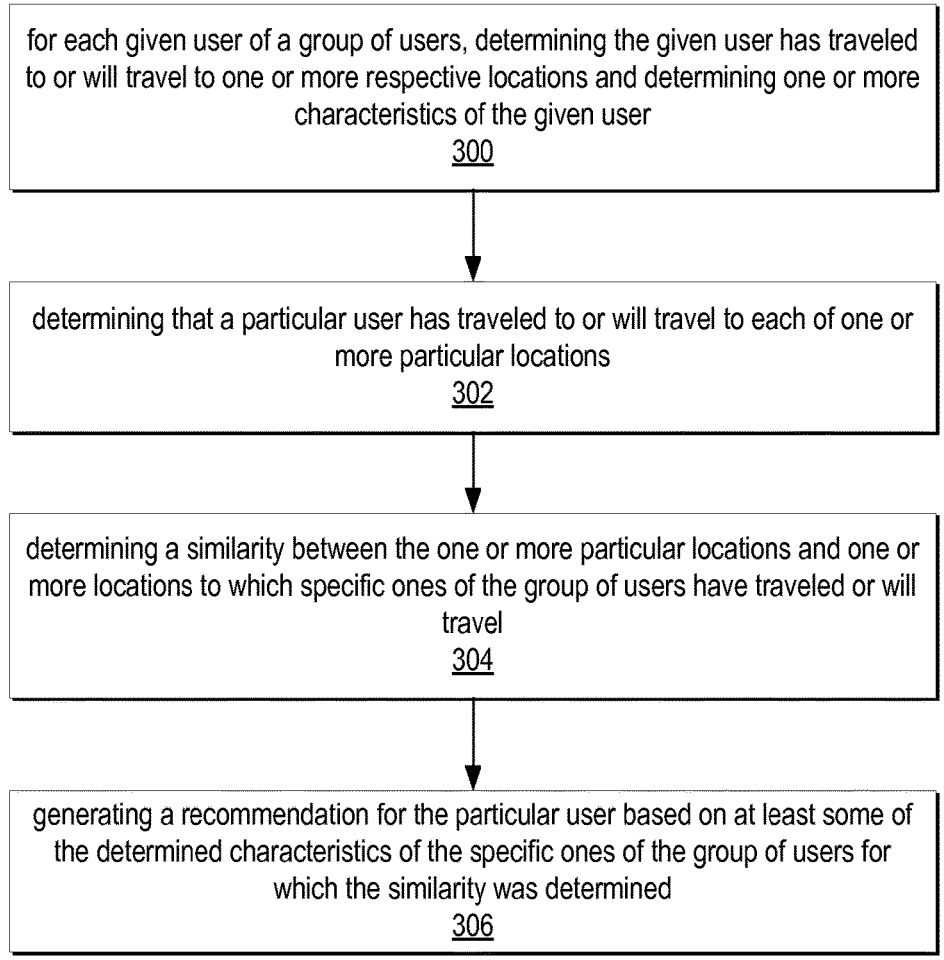
Figure 3C:
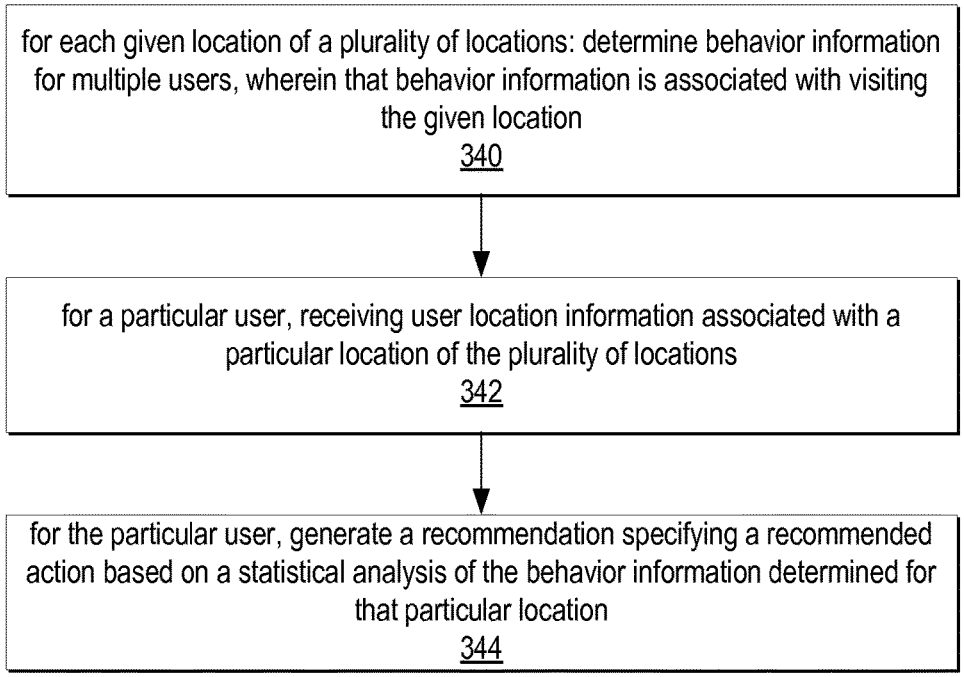

The system and method for generating recommendations based on similarities between location information of multiple users may include various methods, examples of which are described in more detail below. FIGS. 3A-3C illustrate methods for generating recommendations according to various embodiments. Note that the illustrated methods may in some cases be performed by location-based recommendation system 100 described above. As illustrated by block 300, the method may include for each given user of a group of users, determining the given user has traveled to or will travel to one or more respective locations and determining one or more characteristics of the given user. For instance, such a group of users may in some cases correspond to users of various user devices (e.g., user devices 170) and determining that a given user has traveled to or will travel to one or more respective locations may include receiving user location information from such devices. Such user location information may include any of the user location information described above including but not limited to GPS coordinates, locations determined from communication tower triangulation, or indications of cities or regions traveled.

In addition to determining that users have traveled or will travel to one or more locations, the method may also include determining user characteristics for such users. One example of such user characteristics includes user characteristics 150 described above. For instance, in various embodiments, user characteristics may include purchase histories for various users. A given user's purchase history may specify items or services purchased by that user as well as metadata about the purchases (e.g., time/date of purchase, amount spent, shipping or billing address, etc.). In some embodiments, such information may be obtained from an e-commerce website or an entity controlling such website. In various embodiments, characteristics other than purchase histories may be stored for various users. For example, in one embodiment, the user characteristics may specify which applications a user utilizes on his user device. In various embodiments, the user characteristics may specify to which services a user is subscribed. For instance, such a user characteristics might specify that a user is subscribed to a dating service. Example uses for such a user characteristic is described in more detail below with respect to the generation of recommendations.

As illustrated by block 302, the method may also include determining that a particular user has traveled to or will travel to each of one or more particular locations. In some embodiments, such determining may be performed simultaneously while performing the portion of the method described above with respect to block 300. In other cases, the method may include performing the portion associated with block 300 and subsequently determining that the particular user has traveled to or will travel to each of one or more particular locations. The techniques for determining where the particular user has traveled (or will travel) may include any of the techniques for determining where the group of user has traveled, such as described above with respect to block 300 or FIGS. 1-2 (e.g., utilizing GPS, communication tower triangulation, IP tracking, etc.).

As illustrated by block 304, the method may also include determining a similarity between the one or more particular locations and one or more locations to which specific ones of the group of users have traveled or will travel. For instance, the method may include comparing the particular user's location information with the location information of the group of users in order to determine the specific user of the group of user that have user location information matching the particular user's location information. In some embodiments, the method may include determining a similarity between a particular user's location information and the location information of one or more specific users by determining that a specific group of locations (e.g., multiple locations) from the particular user's location information matches a specific group of locations from the location information of the one or more specific users. In some embodiments, the method may include determining a similarity between a particular user's location information and the location information of one or more specific users by determining that a specific path of locations (e.g., a specific series of locations traveled in a certain order) from the particular user's location information matches a specific path of locations from the location information of the one or more specific users. In some embodiments, the method may include determining a similarity between a particular user's location information and the location information of one or more specific users by determining that one or more locations (e.g., a from the particular user's location information) are located within the same region as one or more locations from the location information of the one or more specific users. In some cases, the method may include determining a similarity between the user location information of the particular user and the user location information of the one or more specific users even when the particular user and the one or more specific users did not necessarily travel to the same location within the same region. Such similarity information may be utilized for generating recommendations as described in more detail below.

In some embodiments, the method may also include considering the time at which one or more locations were traveled to (or will be traveled to) when determining similarities among user location information. For instance, in some cases, the method may include only considering locations to be matches if they were visited in the same season (e.g., summer, winter, fall, spring) or some other range of time. In other cases, the method may include only considering locations to be matches if they were visited within a specific time period of each other.

As illustrated by block 306, the method may include generating a recommendation for the particular user based on at least some of the determined characteristics of the specific ones of the group of users for which the similarity was determined (e.g., the similarity determined in block 304). In some embodiments, such a recommendation may include a recommendation for one or more of the user characteristics determined for the specific ones of the group of users. For instance, such characteristics may include items or services purchases by the specific user(s), such as determined from a purchase history associated with those users. In general, the method may include generating a recommendation for any characteristic of those specific users including but not limited to items or services purchased by the specific users, applications installed on the mobile devices of the specific users or even services (e.g., a data service) to which such specific user's are subscribed.

In one example, the similarity may be determined for a particular user and one other user according to any of the techniques described above. In this example, the method may include generating a recommendation that includes a recommendation for any characteristic associated with the other user, such as determined from a data store of user characteristics (e.g., user characteristics 150). For instance, the method may include generating a recommendation for one or more of items or services purchased by the other user. The method may in some cases include generating a message that includes such recommendation and sending such message to a user device associated with the particular user (e.g., a mobile phone, or laptop computer, or some other device). In other cases, instead of items or services purchased, other characteristics of the other user may be recommended to the particular user. For instance, if the other user has a particular application installed on his mobile device, the method may include generating a recommendation for that application (e.g., a mobile phone application). In another example, if the other user has visited a particular place of commerce (e.g., a particular chain of bookstores or other places of commerce), the method may include generating a recommendation for that place of commerce.

If the determined similarity indicates a group of users are determined to be associated with location information similar to that of the particular user, the method may include determining one or more of the most common or popular characteristics associated with the group of users on which to base the recommendation for the particular user. In one example, the method may include ranking the items purchased by the group of users based on the number of users from the group that purchased each item. In this example, the method may include recommending the highest ranked item (or the 2nd highest, 3rd highest, etc.) to the particular user. The method may include performing a similar ranking for other user characteristics. In various embodiments, the method may include generating recommendations that are tailored to a specific region. For instance, in the example of ranked items presented above, the method may include disqualifying recommendations for items or services that, while ranked highly, are not uniquely ranked for a given location (e.g., top sellers for a given city may not be unique to that city if they are also top sellers for the nation that includes that city).

FIG. 3B illustrates another flowchart of an example method of the system and method for generating recommendations based on similarities between location information of multiple users. In various embodiments, the illustrated method may be performed by location-based recommendation system 100 described herein. As illustrated by block 320, the method may include, for each given user of multiple users, receiving user location information for the given user from one or more computing devices associated with that user. For instance, in various embodiments, the method may include receiving user location information from any of the user devices described above (e.g., mobile devices, desktop or laptop computers, etc.). Additionally, such user location information may include information similar to that described above with respect to user location information 140 including but not limited to information indicating that a user has traveled to a particular location and information indicating a user is currently traveling within a particular location. In some cases user location information may include an indication of a location to which the user is expected to travel, such as a location that the user specifies through a user interface (e.g., as described above with respect to user devices 170).

In some embodiments, user location information for a given user may include one or more locations to which the given user is predicted to travel. Various embodiments may include determining such predicted locations based on previous locations visited by the given user. In one example, the method may include performing a Markov chain analysis of historical user location information (and/or other information such as the user characteristics described herein) to determine one or more predicted locations for the given user. In other embodiments, other analyses or techniques may be used to generate such predictions.

As illustrated by block 320, the method may also include user characteristics for the given user. Such user characteristics may include any of the user characteristics described herein including but not limited to purchase histories of items or services purchased by the given user and network-based activity for the given user. For instance such network based activity may include accessing an item detail page of an e-commerce website, purchasing an item on an e-commerce website, and/or adding an item to a wish list of items on an e-commerce website.

As illustrated by block 322, the method may also include receiving user location information for a particular user. Such user location information may be received from one or more computing devices associated with the particular user, such as the user devices described above with respect to FIGS. 1 and 2. User location information may include information indicating locations to which the user has traveled, locations in which the user is currently traveling, and locations to which the user is expected to travel. In some embodiments, the method may also include generating one or more locations to which the user is predicted to travel, such as by utilizing the Markov chain analysis described above.

As illustrated by block 324, the method may also include determining a particular subset of the multiple users that are similar to the particular user. For instance, such a determination may include determining a similarity between the user location information of the particular user and the user location information of that subset of users. In various embodiments, determining such similarity may be similar to the techniques described above with respect to block 304 of FIG. 3A and with respect to similarity analysis component 120 described above.

As illustrated in block 326, the method may also include, for the particular user, generating a recommendation based on the user characteristics corresponding to the subset of user determined in block 324 (i.e., the subset of user determined to be similar to the particular user). For instance, the method may include determining the most popular items among that subset of users (e.g., based on items sold) and recommending such items to the particular user. Similar techniques are described above with respect to recommendation generation component 130; any of such techniques may be employed by the method to generate recommendations in various embodiments.

Various techniques for generating recommendations are also described in U.S. Pat. No. 6,266,649 entitled "Collaborative Recommendations Using Item-To-Item Similarity Mappings" filed on Sep. 18, 1998, whose inventors are Gregory D. Linden, Jennifer A. Jacobi, and Eric A. Benson, and which is herein incorporated by reference in its entirety. For example, the aforesaid reference teaches generating recommendations based on a data set indicating commonality indexes for purchased items (e.g., a commonality index indicating, for various items of a catalog, a percentage of users who bought item A that also bought item B). Such techniques for generating recommendations may also be applied to the data sets of various embodiments. For example, a similar data set may be generated for users that traveled to (or are currently traveling in or expected or predicted to travel to) a given location (or locations) and also purchased a given item (or items). For instance, such a data set may be generated based on user location information 140 and user characteristics 150 described above. In various embodiments, such a data set may be utilized to generate recommendations according to the various techniques described in the aforesaid reference.

FIG. 3C illustrates another example for generating user recommendations according to some embodiments. As illustrated by block 340, the method may include, for each given location of multiple locations, determining behavior information for multiple users; such behavior information may in various embodiments be associated with visiting that given location. In various embodiments, such behavior information may include user location information and/or user characteristics as described above. For example, the behavior information may indicate locations traveled by various users as well as items or services purchased by such users while in or around those locations. The method may include any technique for obtaining such information as described above (e.g., receiving user location information from user devices 170 or monitoring a user's interaction with an e-commerce site to item detail pages that have been viewed or items that have been rated).

As illustrated by block 342, the method may include, for a particular user, receiving user location information associated with a particular location of the plurality of locations. For instance, the method may include receiving from a user device, a location to which the user has traveled, a location in which the user is currently traveling, or a location to which the user is expected or predicted to travel.

As illustrated by block 344, the method may include, for the particular user, generating a recommendation specifying a recommended action based on a statistical analysis of the behavior information determined for that particular location (i.e., the particular location indicated by the particular user's location information). In various embodiments, this statistical analysis may include determining the recommended action as being the most popular action performed by the multiple users in association with that particular location. For example, the most popular action for a particular location might be the purchase of a particular book (e.g., a travel guide) or a particular apparel item (e.g., a winter coat for cold climates, etc.). In some embodiments, such a statistical analysis described herein may include determining the most popular items that are unique to a particular location. Various techniques for determining items that are highly ranked and unique to a particular region are described above with respect to recommendation generation component 130. The method may include utilizing any of such techniques.

In some embodiments, such a statistical analysis may include utilizing any of the techniques described in U.S. Pat. No. 6,963,850 entitled "Computer Services For Assisting Users In Locating and Evaluating Items In An Electronic Catalog Based On Actions Performed by Members of Specific Communities" filed on Aug. 19, 1999, whose inventors are Jeffrey P. Bezos, Joel R. Spiegel, and Jon McAuliffe, and which is herein incorporated by reference in its entirety. For instance, the method may include matching the particular location determined in block 342 to a user community, and then rendering a recommendation to purchase items determined to be popular in that user community.

Example Recommendations

Figure 4:
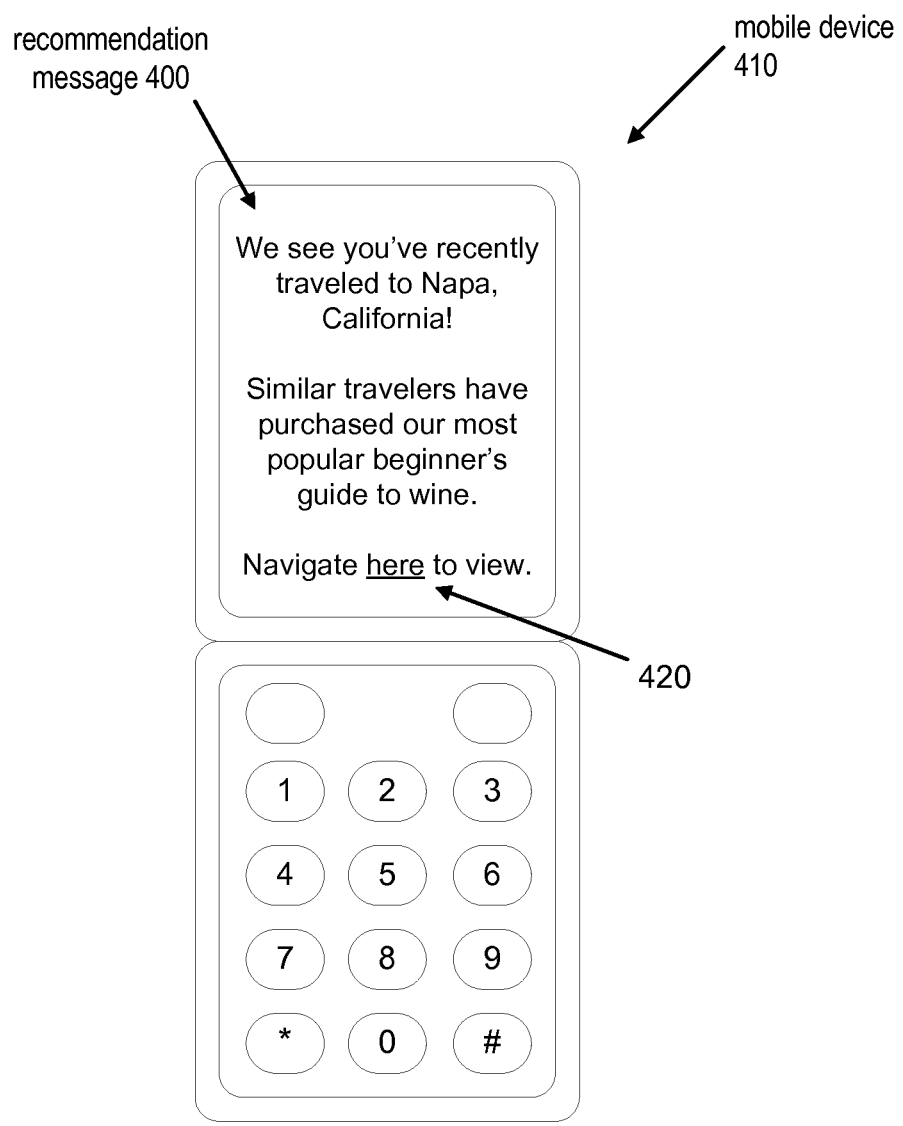
FIG. 4 illustrates an example recommendation message, according to some embodiments.

Various embodiments may include delivering recommendations (such as the recommendations described above) to any of the user devices described herein. In one example, such recommendations may be sent to one or more mobile devices, such as mobile devices that have been subscribed to such recommendations. In various embodiments, the illustrated recommendation message may be generated by the location-based recommendation system described above. In one embodiment, a user might register their mobile device with an e-commerce website in order to receive recommendations for various items or services purchased by user with similar travel habits. FIG. 4 illustrates a mobile device 410 (e.g., a mobile phone or similar device) that has received a recommendation message 400, which may have been generated according to the techniques described above. In various embodiments, the recommendation message may also include a network address 420 (e.g., a hyperlink) for accessing a product detail page for ordering the recommended item or service.

Figure 5:
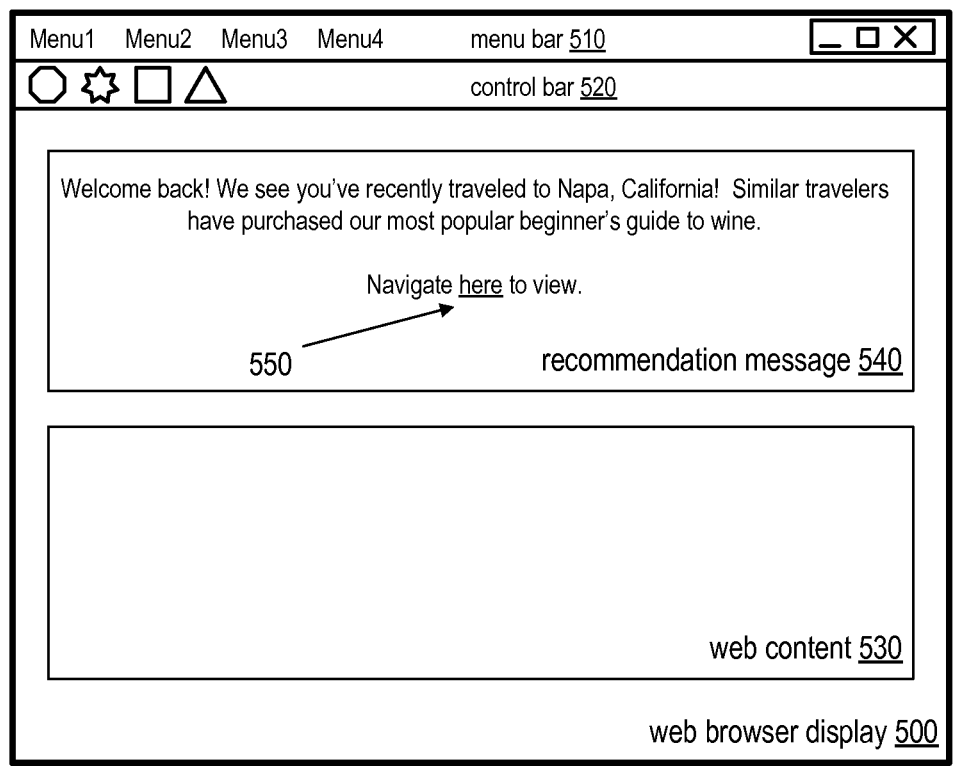
FIG. 5 illustrates another example recommendation message, according to some embodiments.

FIG. 5 illustrates another example of a recommendation message generated according to the techniques described above. In this example, recommendation message 540 may be generated as web content (or other network-based content). In the illustrated embodiment, web browser display 500 may be configured to display various web content 530 as well as a menu bar 510 and control bar 520 for controlling various features of the web browser. In one example, web content 530 may be content of an e-commerce portal enabling users to view, purchase, review, discuss and/or rate various items or services offered for sale. In the illustrated embodiment, recommendation message 540 may be generated according to any of the various techniques described above. In addition, the message may include a network address 550 (e.g., a hyperlink) for accessing a product detail page for ordering the recommended item or service.

Note that the illustrated examples of FIGS. 4 and 5 are presented in a non-limiting manner. Indeed, in various other embodiments, recommendations may be sent through other channels including but not limited to electronic mail ("e-mail"), text messaging (e.g., Short Message Service messages), voice messaging, or any other communication channel.

Example System Configurations

Figure 6:
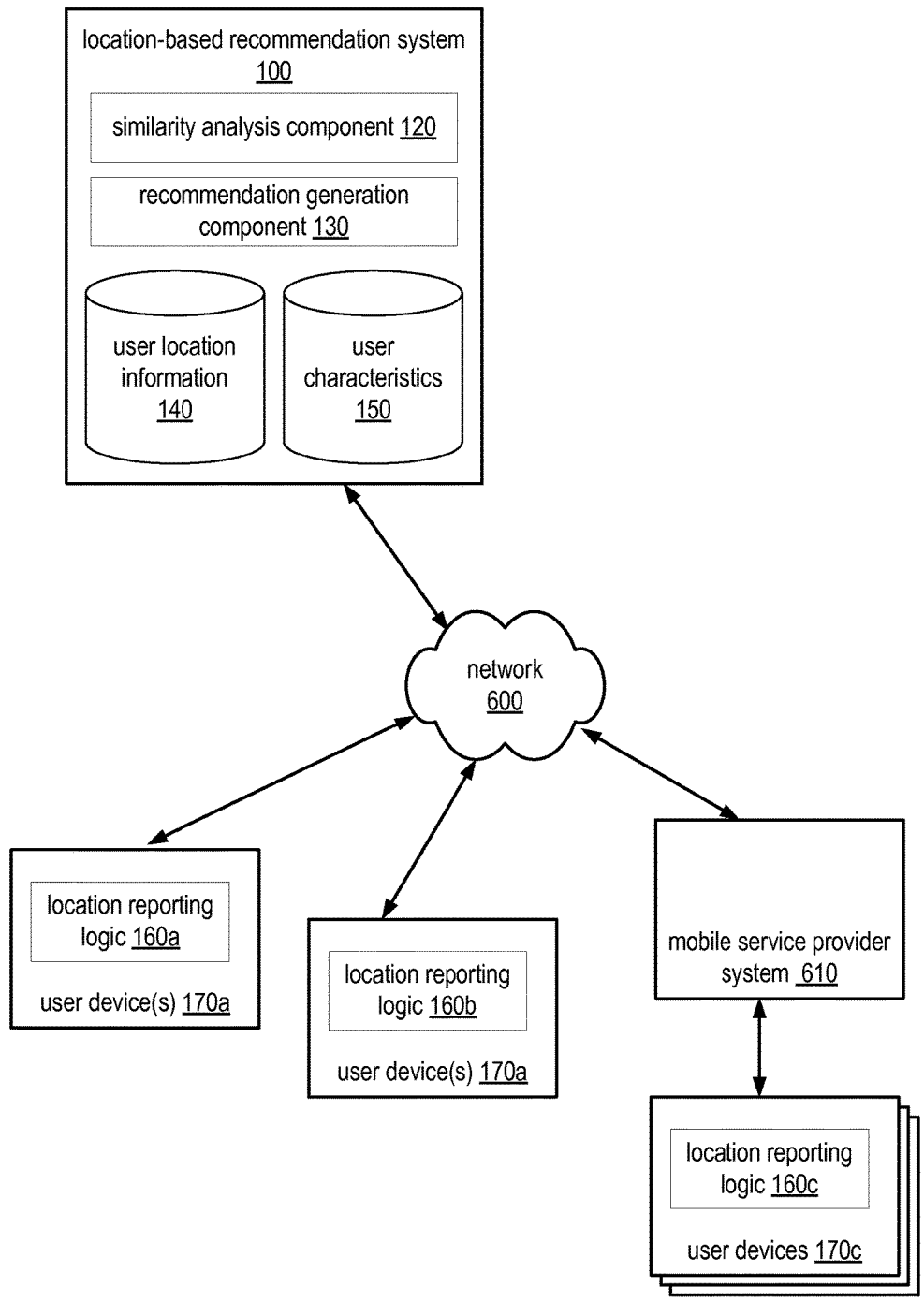
FIG. 6 illustrates an example system configuration, according to some embodiments.

The system and method for generating recommendations based on similarities between location information of multiple users may include various system configurations, according to various embodiments. One example system configuration is illustrated in FIG. 6. As illustrated, the various components of the example system are coupled together via a network 600. Network 600 may include any combination of local area networks (LANs), wide area networks (WANs), some other network configured to communicate data to/from computer systems, or some combination thereof. Each of user devices 170 and location based-recommendation system 100 may be implemented by a computer system, such as computer system 700 described below. In addition, a mobile service provider system 610 may serve as a proxy to multiple user devices 170c (e.g., mobile phones) in some embodiments.

Example System

Various embodiments of a system and method for generating recommendations based on similarities between location information of multiple users, as described herein, may be executed on one or more computer systems, which may interact with various other devices. One such computer system is computer system 700 illustrated by FIG. 7, which in the illustrated example may implement location-based recommendation system 100. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions 722 and data implementing a location-based recommendation system 100 are shown stored within system memory 720. Additionally, user location information and characteristics 734 stored within data 732 of memory 720 may be similar to user location information 140 and user characteristics 150 described above. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices (e.g., user devices 170) attached to a network (e.g., network 600), such as log repository 410 and/or host system 700a and service(s) 750a, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 7:
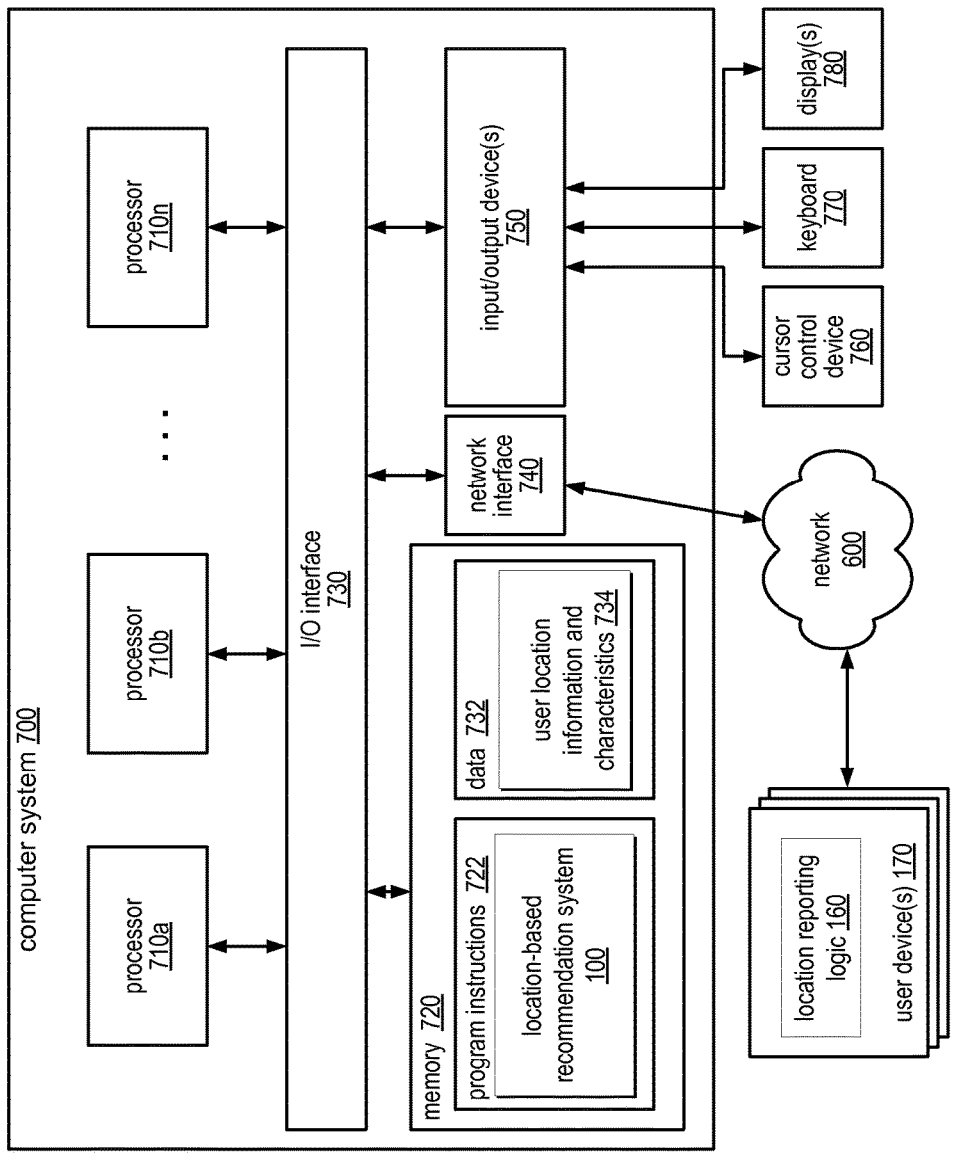
FIG. 7 illustrates one example of a system for implementing a location-based recommendation system, according to some embodiments.

As shown in FIG. 7, memory 720 may include program instructions 722 configured to implement location-based recommendation system 100. In one embodiment, the program instructions may implement the methods described above, such as the methods illustrated by FIGS. 3A-3C. In other embodiments, different elements and data may be included. As illustrated, note that data 732 may include user location information and characteristics 734, which may be similar to (or the same as) those describe above with respect to FIG. 1.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising: performing, by one or more hardware processors of one or more computers:
for individual given users of a plurality of users: receiving, by a location-based recommendation system, user location information that indicates a user's location, the location on a path associated with the user, and associated time information that the user was at the location for the given user from one or more computing devices associated with the given user, and determining one or more user characteristics for the given user;
determining, based on clustering distance metrics of multiple users of the plurality of users, one or more regions that define respective subsets of the plurality of users;
receiving, by the location-based recommendation system, user location information for a particular user from one or more computing devices associated with the particular user that indicates the user location in near real-time with the user's presence on the path;
determining, by a similarity analysis component, a particular subset of the subsets of the plurality of users that is similar to the particular user, wherein the determining the particular subset comprises determining a similarity between user path information comprising the user location information for the particular user and user path information of the plurality of users of the particular subset, wherein the similarity is based at least in part on a similarity between the real-time information for the particular user and time information indicating when one or more of the plurality of users of the particular subset were on a similar path associated with the particular subset;

for said particular user, generating, by a recommendation generation component, a recommendation based at least in part on the user characteristics corresponding to the particular subset of the plurality of users;

generating a message including the recommendation; and transmitting said message over a network to at least one computing device controlled by the particular user such that the computing device receives the message in near real-time with the particular user's presence on the path, the message including the recommendation that is based at least in part on the user characteristics corresponding to the particular subset of the plurality of users.

2. The computer-implemented method of claim 1, wherein the method further comprises determining one or more user characteristics for the particular user; wherein determining the particular subset of users further comprises determining a similarity between the user characteristics of the particular user and the user characteristics corresponding to the particular subset of the plurality of users.

3. The computer-implemented method of claim 1, wherein said at least one computing device comprises one or more of: a mobile telephone, a personal digital assistant, a laptop computer system, a desktop computer system, and a navigation device.

4. The computer-implemented method of claim 1, wherein the user location information for a given user specifies one or more of: a location to which that user has traveled, a location in which that user is currently traveling, a location to which that user is expected to travel, and a location to which that user is predicted to travel.

5. The computer-implemented method of claim 1, wherein at least some of the user location information for the plurality of users and the particular user includes information generated based on one or more of: the global positioning system (GPS), communication tower triangulation, and user-input specifying a location.

6. The computer-implemented method of claim 1, wherein said one or more user characteristics of the given user indicate one or more of: an item or service purchased by the given user, and a network-based activity performed by the given user.

7. The computer-implemented method of claim 6, wherein said network-based activity includes one or more of: accessing an item detail page of an e-commerce web site, purchasing an item on an e-commerce web site, and adding an item to a wish list of items on an e-commerce website.

8. The computer-implemented method of claim 1, wherein said one or more characteristics of the given user comprise an indication that the given user has traveled to a particular place of commerce.

9. The computer-implemented method of claim 1, wherein said recommendation includes one or more of: a recommended item or service purchased by the particular subset of the plurality of users according to the user characteristics for the particular subset, and a recommended location determined from the user location information for the particular subset.

10. The computer-implemented method of claim 1, wherein said determining the particular subset of the plurality of users that is similar to the particular user comprises weighting at least the user location information of the plurality of users with a time decay value that diminishes over a configurable time.

11. A computer-implemented method, comprising:

performing, by one or more hardware processors of one or more computers:

for individual given locations of a plurality of locations on one or more paths: determining, by a location-based recommendation system and for a plurality of users that have or are expected to visit respective ones of the individual given locations, behavior information including user location information, and associated time information that each of the plurality of users have or are expected to visit respective ones of the individual given locations, wherein at least some of said behavior information is received from one or more computing devices associated with the plurality of users;

for a particular user, receiving, by the location-based recommendation system, user location information indicating a particular location of said plurality of locations from a computing device associated with that user, wherein the user location information indicates the user location in near real-time with the user's presence on a path comprising the indicated particular location;

generating, by a recommendation generation component, a recommendation for the particular user, said recommendation specifying a recommended action based on a statistical analysis of the behavior information for the particular path, wherein the statistical analysis includes analysis of a similarity between the real-time information for the particular user and time information for one or more of the plurality of users;

wherein the recommendation comprises a recommendation of an item to be purchased through an e-commerce website;

generating a message comprising the recommendation; and sending said message to at least one computing device controlled by the particular user such that the at least one computing device receives the message in near real-time with the particular user's presence on the path.

12. The computer-implemented method of claim 11, wherein the recommended action of said recommendation indicates one or more of: an item to purchase, a service to purchase and a location to visit.

13. The computer-implemented method of claim 11, wherein the user location information for the particular user specifies one or more of: a location to which that user has traveled, a location in which that user is currently traveling, a location to which that user is expected to travel, and a location to which that user is predicted to travel.

14. The computer-implemented method of claim 11, wherein for a given one of the plurality of users, the behavior information of that user indicates one or more of: a location to which that user has traveled, a location in which that user is currently traveling, a location to which that user is expected to travel, and a location to which that user is predicted to travel, an item or service purchased by that user, and a network-based activity performed by that user.

15. The computer-implemented method of claim 11, wherein said statistical analysis of the behavior information for the particular location comprises determining the recommended action as being a most popular action performed by the plurality of users in association with that particular location.

16. A system, comprising:
a memory; and
one or more hardware processors coupled to the memory, wherein the memory comprises program instructions that are executed by the one or more hardware processors to implement:
a location-based recommendation service configured to:
for individual given users of a plurality of users:
receive user location information and associated time information that the user was at the location for the given user from one or more computing devices associated with the given user, the user location on a path associated with the user, and determine one or more user characteristics for the given user;
cluster distance metrics of multiple users of the plurality of users to determine one or more regions that define respective subsets of the plurality of users;
receive user location information for a particular user from one or more computing devices associated with the particular user, wherein the user location information for the particular user indicates the user location in near real-time with the user's presence on the path associated with the user;
determine a particular subset of the subsets of the plurality of users that are similar to the particular user, wherein the program instructions to determine the particular subset further comprise program instructions to determine a similarity between user path information for the particular user and user path information of the plurality of users of the particular subset, wherein the similarity is based at least in part on a similarity between the near real-time information for the particular user and the time information indicating when one or more of the plurality of users of the particular subset were on a similar path associated with the particular subset; and
for said particular user, generate a recommendation based on the user characteristics corresponding to the particular subset of the plurality of users;
wherein the program instructions are configured to:
generate a message comprising the recommendation, and
send said message to at least one computing device controlled by the particular user such that the computing device receives the message in near real-time with the particular user's presence on the path associated with the user, the message including the recommendation that is based at least in part on the user characteristics corresponding to the particular subset of the plurality of users.

17. The system of claim 16, wherein the program instructions are configured to determine one or more user characteristics for the particular user; wherein to determine the particular subset of users, the program instructions are further configured to determine a similarity between the user characteristics of the particular user and the user characteristics corresponding to the particular subset of the plurality of users.

18. The system of claim 16, wherein said at least one computing device comprises one or more of: a mobile telephone, a personal digital assistant, a laptop computer system, a desktop computer system, and a navigation device.

19. The system of claim 16, wherein the user location information for a given user specifies one or more of: a location to which that user has traveled, a location in which that user is currently traveling, a location to which that user is expected to travel, and a location to which that user is predicted to travel.

20. The system of claim 16, wherein at least some of the user location information for the plurality of users and the particular user includes information generated based on one or more of: the global positioning system (GPS), communication tower triangulation, and user-input specifying a location.

21. The system of claim 16, wherein said one or more user characteristics of the given user indicate one or more of: an item or service purchased by the given user, and a network-based activity performed by the given user.

22. The system of claim 21, wherein said network-based activity includes one or more of: accessing an item detail page of an e-commerce website, purchasing an item on an e-commerce web site, and adding an item to a wish list of items on an e-commerce web site.

23. The system of claim 16, wherein said one or more characteristics of the given user comprise an indication that the given user has traveled to a particular place of commerce.

24. The system of claim 16, wherein said recommendation includes one or more of: a recommended item or service purchased by the particular subset of the plurality of users according to the user characteristics for the particular subset, and a recommended location determined from the user location information for the particular sub set.

25. The system as recited in claim 16, wherein the program instructions to determine the particular subset of the plurality of users that is similar to the particular user comprise program instructions to weight the user location information of the plurality of users with a time decay value that diminishes over a configurable time.

26. A non-transitory computer-readable storage medium, storing program instructions that are computer-executable to:
implement a location-based recommendation service configured to:
for individual given users of a plurality of users:
receive user location information and associated time information that the user was at the location for the given user from one or more computing devices associated with the given user, the location on a path associated with the user, and determine one or more user characteristics for the given user;
cluster distance metrics of multiple users of the plurality of users to determine one or more regions that define respective subsets of the plurality of users;
determine, based at least in part on received user location information that indicates the user location in near real-time with the user's presence on the path, user path information for a particular user from one or more computing devices associated with the particular user;
determine a particular subset of the subsets of the plurality of users that is similar to the particular user, wherein the program instructions computer executable to determine the particular subset further comprise program instructions computer executable to determine a similarity between user path information of the particular user and user path information of the plurality of users of the particular subset, wherein the similarity is based at least in part on a similarity between the real-time information for the particular user and time information indicating when one or more of the plurality of users of the particular subset were on a similar path associated with the particular subset; and for said particular user, generate a recommendation based at least in part on the user characteristics associated with behavior information for the location corresponding to the particular subset of the plurality of users;

wherein the program instructions when executed:
generate a message comprising the recommendation, and
send said message to at least one computing device controlled by the particular user such that the computing device receives the message in near real-time with the particular user's presence on the path associated with the user, the message including the recommendation that is based at least in part on the user characteristics corresponding to the particular subset of the plurality of users.

27. The non-transitory computer-readable storage medium of claim 26, wherein the program instructions are configured to determine one or more user characteristics for the particular user; wherein to determine the particular subset of users, the program instructions are further configured to determine a similarity between the user characteristics of the particular user and the user characteristics corresponding to the particular subset of the plurality of users.

28. The non-transitory computer-readable storage medium of claim 26, wherein said at least one computing device comprises one or more of: a mobile telephone, a personal digital assistant, a laptop computer system, a desktop computer system, and a navigation device.

29. The non-transitory computer-readable storage medium of claim 26, wherein the user location information for a given user specifies one or more of: a location to which that user has traveled, a location in which that user is currently traveling, a location to which that user is expected to travel, and a location to which that user is predicted to travel.

30. The non-transitory computer-readable storage medium of claim 26, wherein at least some of the user location information for the plurality of users and the particular user includes information generated based on one or more of: the global positioning system (GPS), communication tower triangulation, and user-input specifying a location.

31. The non-transitory computer-readable storage medium of claim 26, wherein said one or more user characteristics of the given user indicate one or more of: an item or service purchased by the given user, and a network-based activity performed by the given user.

32. The non-transitory computer-readable storage medium of claim 31, wherein said network-based activity includes one or more of: accessing an item detail page of an e-commerce web site, purchasing an item on an e-commerce web site, and adding an item to a wish list of items on an e-commerce web site.

33. The non-transitory computer-readable storage medium of claim 26, wherein said one or more characteristics of the given user comprise an indication that the given user has traveled to a particular place of commerce.

34. The non-transitory computer-readable storage medium of claim 26, wherein
said recommendation includes one or more of: a recommended item or service purchased by the particular subset of the plurality of users according to the user characteristics for the particular subset, and a recommended location determined from the user location information for the particular subset,
the recommendation is based at least in part upon a season in which the particular user will visit the location, and
the recommendation is based at least in part upon a season in which the particular subset of the plurality of users visited the location.

35. The non-transitory computer-readable storage medium of claim 26, wherein the program instructions computer executable to determine the particular subset further comprise program instructions computer executable to weight the user location information of the plurality of users with a time decay value that diminishes over a configurable time.

* * * * *